(12) United States Patent
Ueda (10) Patent No.: US 11,099,161 B2
(45) Date of Patent: Aug. 24, 2021

(54) IONIZER AND MASS SPECTROMETER

(71) Applicant: SHIMADZU CORPORATION, Kyoto (JP)

(72) Inventor: Manabu Ueda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/339,089

(22) PCT Filed: Nov. 29, 2016

(86) PCT No.: PCT/JP2016/085326
§ 371 (c)(1),
(2) Date: Apr. 3, 2019

(87) PCT Pub. No.: WO2018/100612
PCT Pub. Date: Jun. 7, 2018

(65) Prior Publication Data
US 2020/0041471 A1 Feb. 6, 2020

(51) Int. Cl.
*H01J 49/16* (2006.01)
*G01N 30/72* (2006.01)
(Continued)

(52) U.S. Cl.
CPC ........... *G01N 30/726* (2013.01); *G01N 27/62* (2013.01); *G01N 30/7266* (2013.01);
(Continued)

(58) Field of Classification Search
CPC ...... G01N 27/62; G01N 30/72; G01N 30/726; G01N 30/7266; H01J 49/04; H01J 49/10; H01J 49/167; H01J 49/168
See application file for complete search history.

(56) References Cited

U.S. PATENT DOCUMENTS 7,411,186 B2 * 8/2008 Mordehai ............ H01J 49/107
250/281
2001/0022344 A1 * 9/2001 Takada .................. H01J 49/168
250/288
(Continued)

FOREIGN PATENT DOCUMENTS

CN 101211741 A 7/2008
JP 08-236064 A 9/1996
(Continued)

OTHER PUBLICATIONS

"LCMS-IT-TOF, Liquid Chromatograph Mass Spectrometer, Options for Ionization (APPI, APCI)", online search on Nov. 7, 2016, Shimadzu Corporation, the Internet, pp. 1-2.
(Continued)

*Primary Examiner* — Wyatt A Stoffa
(74) *Attorney, Agent, or Firm* — Sughrue Mion, PLLC (57) ABSTRACT

An ionizer includes an ionization probe (21) provided with a capillary (211), a metallic slender tube (212), and a nebulizing gas pipe (213). The ionization probe (21) is equipped to perform ESI-based ionization of components in a liquid sample. An electroconductive capillary (22) is disposed at a position forward in a flow direction of a nebulized flow of the liquid sample from the ionization probe (21). A high voltage from a high voltage power supply (23) is applied to the electroconductive capillary (22) to induce corona discharge so that the components in the liquid sample are ionized by the APCI as well. At the time of tuning the ionizer, a standard sample solution is provided through the electroconductive capillary (22), and a high voltage from the high voltage power supply (23) is applied to the elec-troconductive capillary (22) so that components in the standard sample solution are ionized by the ESI or due to an ion molecular reaction with solvent molecular ions produced in the ionization probe (21). Thus, components in a standard
(Continued)

sample can be ionized and subjected to mass spectrometry without pipe rearranging operations or without switch to and from different flow paths using a valve.

14 Claims, 4 Drawing Sheets

(51) Int. Cl.
  *G01N 27/62* (2021.01)
  *H01J 49/04* (2006.01)
  *H01J 49/10* (2006.01)
(52) U.S. Cl.
  CPC .............. *H01J 49/04* (2013.01); *H01J 49/10* (2013.01); *H01J 49/167* (2013.01); *H01J 49/168* (2013.01)

(56) References Cited

U.S. PATENT DOCUMENTS

| | | | | |
|---|---|---|---|---|
| 2006/0255261 A1* | 11/2006 | Whitehouse | ........ | H01J 49/0431 250/288 |
| 2007/0023675 A1* | 2/2007 | Fischer | ................ | H01J 49/162 250/423 P |
| 2009/0236518 A1* | 9/2009 | Kobayashi | ............ | H01J 49/168 250/288 |
| 2011/0108726 A1* | 5/2011 | Hiraoka | ............... | H05H 1/2406 250/282 |
| 2012/0104248 A1* | 5/2012 | Hardman | ............... | H01J 49/167 250/288 |
| 2013/0341503 A1* | 12/2013 | Whitehouse | .......... | H01J 49/168 250/287 |
| 2014/0291544 A1* | 10/2014 | Hardman | ............... | H01J 49/107 250/423 R |
| 2014/0326871 A1* | 11/2014 | Whitehouse | .......... | H01J 49/165 250/288 |
| 2016/0300703 A1* | 10/2016 | Hasegawa | ............... | G01N 27/62 |

FOREIGN PATENT DOCUMENTS

| JP | 2004342620 A | 12/2004 |
|---|---|---|
| JP | 2011-009240 A | 1/2011 |

OTHER PUBLICATIONS

"LCMS-2020, Superspeed Single Quadrupole Mass Spectrometer, Dual Ion Source, DUIS-2020", online search on Nov. 7, 2016, Shimadzu Corporation, the Internet, pp. 1-3.
International Search Report for PCT/JP2016/085326 dated Mar. 7, 2017 [PCT/ISA/210].
Written Opinion for PCT/JP2016/085326 dated Mar. 7, 2017 [PCT/ISA/237].
Notice of Reasons for Refusal dated Sep. 10, 2019 from the Japanese Patent Office in application No. 2018-553522.
Communication dated Nov. 30, 2020 from the State Intellectual Property Office of the P.R. of China in Application No. 201680091242.3.

* cited by examiner

IONIZER AND MASS SPECTROMETER

CROSS REFERENCE TO RELATED APPLICATIONS

This application is a National Stage of International Application No. PCT/JP2016/085326 filed Nov. 29, 2016.

TECHNICAL FIELD

The present invention relates to an ionizer used to ionize components included in a sample and a mass spectrometer provided with the ionizer, more particularly to an ionizer suitably used as an ion source in apparatuses including mass spectrometers and ion mobility spectrometers, and a mass spectrometer provided with such an ionizer.

BACKGROUND ART

Variously different ionizing methods have been developed and are available for use in mass spectrometers to ionize sample components. Such methods may be roughly divided into two types of ionizing techniques; one performed in vacuum atmosphere, and the other performed in atmosphere at substantially atmospheric pressure. The latter ionizing technique may be conventionally called atmospheric pressure ionization (API). There are merits of the atmospheric pressure ionization, for example, that evacuating an ionization chamber is unnecessary, and ionization is easily feasible with samples in liquid form or containing abundant water that may be difficult to handle in vacuum atmosphere.

Atmospheric pressure chemical ionization (APCI) is one of the well-known means of the atmospheric pressure ionization. In the ionization probe for use in the APCI described in Patent Literature 1 or Non Patent Literature 1, sample solution is blown and nebulized, assisted by a nebulizing gas flow, into a space surrounded by a heater of approximately 300 to 500° C. This vaporizes the solvent and the sample to molecules. A needle electrode is disposed at a position ahead of the nebulized sample flow, and corona discharge is generated when a high voltage of approximately ±3 to 5 kV (the polarity of the voltage depends on the ionic polarity) is applied to the needle electrode. This electric discharge ionizes molecules of the solvent, and induces reactions that involve release and uptake of protons between the sample molecules and solvent molecular ions. The sample molecules are ionized through the reactions (ion molecular reactions).

As described in Non Patent Literature 1, the APCI is typically suitable for ionization of compounds with low and intermediate polarities. On the other hand, the APCI has difficulty in ionizing compounds with high polarities. A known ionizer that can ionize wide-range compounds with low to high polarities is the dual ion source (DUIS) method described in Non-Patent Literature 2. The DUIS method uses, as an ion source, a structure in which a needle electrode is disposed at a position ahead of an ionization probe adapted for use in electrospray ionization (ESI). The sample molecules in the sample solution are ejected by electrostatic spraying from the ionization probe and ionized by the ESI. At the same time, the sample molecules are ionized by the APCI, that is, the sample particles are also ionized by the solvent molecular ions produced by electric discharge generated by the voltage application to the needle electrode. Thus, by using the ion source that allows target particles to be ionized by the ESI and APCI at the same time, the DUIS method can ionize any compounds included in the sample solution regardless of their polarities, whether they are high or low.

Conventional mass spectrometers required tuning before starting analysis operation in order to optimize parameters, for example, voltages to be applied to respective units including an ion guide. For the tuning, a standard sample containing known components was conventionally used. In a liquid chromatograph mass spectrometer (LC-MS), in which a liquid chromatograph is connected to a mass spectrometer, an eluate pipe is connected between the column outlet of the liquid chromatograph and the ionization probe of the mass spectrometer. At the time of tuning of such an apparatus, an operator has to disconnect the eluate pipe from the ionization probe of the mass spectrometer, and connect a standard sample pipe connected to a standard sample container to the ionization probe of the mass spectrometer. Otherwise, instead of such pipe rearranging operations, a flow-switching valve may be disposed in a pipe connecting the column outlet of the liquid chromatograph to the ionization probe of the mass spectrometer.

Such pipe rearranging operations are time-consuming, and decrease the efficiency of the whole analytical work. On the other hand, disposing a flow-switching valve increases apparatus costs, and may raise the problem of contamination because eluates from the standard sample and the liquid chromatograph are selectively guided to run through a pipe in the ionization probe and a pipe interconnecting the ionization probe and the flow-switching valve.

CITATION LIST

Patent Literature

Patent Literature 1: JP 2011-9240 A

Non Patent Literature

Non Patent Literature 1: "LCMS-IT-TOF, Liquid Chromatograph Mass Spectrometer, Options for Ionization (APPI, APCI)", online search on Nov. 7, 2016, Shimadzu Corporation, the Internet Non Patent Literature 2: "LCMS-2020, Superspeed Single Quadrupole Mass Spectrometer, Dual Ion Source, DUIS-2020", online search on Nov. 7, 2016, Shimadzu Corporation, the Internet

SUMMARY OF INVENTION

Technical Problem

To address the issues of the known art, the present invention provides an ionizer operable to ionize components in a standard sample and to introduce ions of the components into an analyzer at the time of tuning the mass spectrometer without pipe rearranging operations or without use of a flow-switching valve. The present invention also provides a mass spectrometer provided with such an ionizer.

Solution to Problem

An ionizer according to the present invention made in order to address the issues of the known art includes:

a) a nebulizer configured to eject a liquid sample into atmosphere at atmospheric pressure to form a nebulized flow of the liquid sample;

b) an electroconductive capillary disposed at a position forward in a flow direction of the nebulized flow formed by the nebulizer; and c) a voltage application unit configured to apply a voltage to the electroconductive capillary.

In the ionizer according to the present invention, when used to ionize sample components, for example, in an eluate flowing out of the column of a liquid chromatograph, the nebulizer ejects the eluate into atmosphere at atmospheric pressure and forms a nebulized flow of the eluate. The voltage application unit applies a predetermined high voltage (typically, several kV at maximum) to the electroconductive capillary. As a result of the voltage being applied to the electroconductive capillary, an un-uniform electric field is generated around the tip of the electroconductive capillary, which induces corona discharge. Then, molecules of the solvent vaporized from the nebulized eluate are ionized by the corona discharge, followed by a chemical reaction between the solvent molecular ions and molecules of the sample components (ion molecular reaction). This reaction ionizes the sample component molecules. Thus, the ionizer according to the present invention performs APCI-based ionization using the electroconductive capillary, instead of the needle electrode conventionally used in the APCI ionizers to generate corona discharge.

The electroconductive capillary may also be used to introduce any liquid or gas into a space disposed forward in the flow direction of the nebulized flow formed by the nebulizer. The ionizer according to the present invention, when used to ionize, for example, components in a standard sample solution instead of the eluate, provides the standard sample solution to the electroconductive capillary through an appropriate pipe. The voltage application unit applies a predetermined high voltage to the electroconductive capillary. Then, an electric field generated by applying a high voltage to the electroconductive capillary exerts an action upon the standard sample solution flowing through the electroconductive capillary, nebulizing the solution electrically charged. The components included in the standard sample solution are accordingly ionized by the ESI. The ionizer according to the present invention can ionize the components in the solution by directly providing the standard sample solution through the electroconductive capillary, without using the nebulizer.

In the ionizer according to the present invention, the nebulizer may have the function of performing the APCI-based ionization alone or performing both of the APCI-based ionization and ESI-based ionization, as in the DUIS method.

The ionizer according to a first aspect of the present invention, therefore, is characterized in that the nebulizer has a nozzle configured to eject the liquid sample and a heater configured to dry the liquid sample ejected through the nozzle, and the components in the liquid sample are ionized by atmospheric pressure chemical ionization through corona discharge generated by the voltage applied to the electroconductive capillary by the voltage application unit.

In the ionizer according to this aspect, ejection of the liquid sample through the nozzle may be assisted by a nebulizing gas flow. The heater may heat a space that receives the nebulized liquid sample ejected through the nozzle or may spray a heated gas (typically, inert gas) onto droplets of the liquid sample ejected through the nozzle.

The ionizer according to a second aspect of the present invention is characterized in that the nebulizer has an electric field former configured to form a biased electric field that acts upon the liquid sample, and a nozzle configured to eject a nebulized flow of the liquid sample electrically charged by the electric field. In this ionizer, the components in the liquid sample are ionized by electrospray ionization and also ionized by atmospheric pressure chemical ionization through corona discharge generated by the voltage applied to the electroconductive capillary by the voltage application unit.

In the ionizer according to this aspect, a nebulizing gas flow may be used likewise to assist ejection of the liquid sample through the nozzle.

It is required of the ionizer according to the first aspect to apply a high voltage to the electroconductive capillary so as to generate corona discharge at the time of ionizing the components in the nebulized liquid sample ejected by the nebulizer. On the other hand, corona discharge using the electroconductive capillary is not necessarily required of the ionizer according to the second aspect in order to ionize the components in the liquid sample ejected by the nebulizer. Because of such a difference, different means may be employed to provide the standard sample through the electroconductive capillary and to ionize the components included in the provided standard sample.

In the ionizer according to the first aspect, components in the standard sample solution provided through the electroconductive capillary are ionized by the ESI in which a predetermined high voltage is applied to the electroconductive capillary.

The ionizer according to the first aspect may further include a liquid provider configured to provide a second liquid sample through the electroconductive capillary. This ionizer is further characterized in that components in the second liquid sample are ionized by electrospray ionization by applying a predetermined voltage to the electroconductive capillary through which the second liquid sample flows, without ejecting the liquid sample from the nebulizer. The second liquid sample may be, for example, a standard sample solution used for tuning of and/or creating a calibration curve for a mass spectrometer provided with the ionizer described herein.

As with the ionizer according to the first aspect, the ionizer according to the second aspect may employ electrospray ionization to ionize components in the second liquid sample provided through the electroconductive capillary. The ionizer according to the second aspect may further include a liquid provider configured to provide a second liquid sample through the electroconductive capillary. This ionizer is further characterized in that components in the second liquid sample are ionized by electrospray ionization by applying a predetermined voltage to the electroconductive capillary through which the second liquid sample flows, without ejecting the liquid sample from the nebulizer.

The ionizer according to the second aspect may ionize components in a liquid or a gas introduced through the electroconductive capillary using, in the nebulizer, solvent molecular ions produced by the electrospray ionization.

The ionizer according to the second aspect may further include a liquid provider configured to provide a second liquid sample through the electroconductive capillary. This ionizer is further characterized in that the nebulizer, with the biased electric field formed by the electric field former acting upon the liquid sample, ejects through the nozzle the liquid sample electrically charged so that molecules of a solvent in the liquid sample are ionized by electrospray ionization, and molecular ions of the solvent accordingly produced are used to ionize components in the second liquid sample provided by the liquid provider through the electroconductive capillary due to an ion molecular reaction.

The ionizer according to the second aspect may further include a gas provider configured to provide a gas sample through the electroconductive capillary. This ionizer is further characterized in that the nebulizer, with the biased electric field formed by the electric field former acting upon the liquid sample, ejects through the nozzle the liquid sample electrically charged so that molecules of a solvent in the liquid sample are ionized by electrospray ionization, and molecular ions of the solvent accordingly produced are used to ionize components in the gas sample provided by the gas provider through the electroconductive capillary due to an ion molecular reaction.

In this instance, a gas standard sample may be used for tuning of and/or creating a calibration curve for a mass spectrometer provided with the ionizer described herein. Additionally, a solid standard sample easily gasified, i.e., having high volatility, may also be used with the ionizer described herein.

In the ionizer characterized as described thus far and below, the liquid sample provided to the nebulizer may desirably be a sample (blank sample) not containing any substantive component but containing only a solvent (including mobile phase in liquid chromatograph).

The ionizer according to the second aspect may further include a helium provider configured to provide helium through the electroconductive capillary, and a heater configured to heat a gas flow flowing out from the electroconductive capillary. This ionizer is further characterized in that a sample in solid or liquid form is disposed at a position ahead of a tip of the electroconductive capillary, electric discharge is generated by applying a voltage to the nozzle of the nebulizer using the electric field former without providing the liquid sample through the nozzle or by applying a voltage to the electroconductive capillary using the voltage application unit, the helium provided by the helium provider through the electroconductive capillary is excited due to an action of the electric discharge, and components in the sample are ionized by exposing the sample to the helium excited.

In the ionizer thus characterized, the helium flowing out from the electroconductive capillary changes into excited triplet molecular helium due to the electric discharge. When this excited triplet molecular helium is heated by the heater and come in contact with water molecules in atmosphere, the water molecules are ionized by Penning ionization. As the sample is exposed to a gas containing the excited triplet molecular helium heated to a high temperature, molecules of the sample components are vaporized. When water molecular ions excited by Penning ionization exerts an action upon the vaporized component molecules, a reaction accordingly generated causes the component molecules to be ionized. This ionizing mechanism is similar to an ionizing method called, direct analysis in real time (DART), in which solid or liquid samples may be directly ionized, i.e., in-situ ionization is feasible.

The ionizer according to the second aspect may further include a hydrogen provider configured to provide hydrogen through the electroconductive capillary.

This ionizer is further characterized in that electric discharge is generated by applying a voltage to the nozzle of the nebulizer using the electric field former without providing the liquid sample through the nozzle or by applying a voltage to the electroconductive capillary using the voltage application unit, and the hydrogen provided by the hydrogen provider through the electroconductive capillary is ionized due to an action of the electric discharge.

In the ionizer thus characterized, hydrogen ions may serve as a cleaning gas, thus removing any contaminant adhered to, for example, the inner wall surface of an ionization chamber used to ionize the components in the liquid sample. In a mass spectrometer provided with the ionizer thus configured, contaminant may be removed from rear-stage optical devices for ion transport including an ion guide disposed subsequent to the ionization chamber.

A mass spectrometer according to the present invention is provided with, as an ion source, one of the ionizers of the present invention characterized as described thus far. The mass spectrometer according to the present invention is specifically a mass spectrometer for atmospheric pressure ionization equipped to ionize components in a liquid sample at substantially atmospheric pressure and subject the ionized sample to mass spectrometry. The mass spectrometer according to the present invention can constitute a liquid chromatograph mass spectrometer in combination with, for example, a liquid chromatograph.

Advantageous Effects of Invention

According to the ionizer and the mass spectrometer provided by the present invention, a gas or liquid standard sample can be introduced into an ion-producing region through an electroconductive capillary used to generate corona discharge for APCI-based ionization of sample components. Therefore, pipe rearranging operations or additional use of a flow-switching valve is unnecessary regardless of whether to ionize components in the standard sample or components in a liquid sample to be analyzed. The labor of pipe rearranging operations by an operator, therefore, may become unnecessary. The present invention may avoid, for example, cost increase because of the need to dispose a flow-switching valve between an ionization probe and the column of a liquid chromatograph, and contamination possibly caused by using the same flow path to deliver the liquid sample to be analyzed and the standard sample.

DESCRIPTION OF EMBODIMENTS

An embodiment of a mass spectrometer provided with an ionizer according to the present invention is hereinafter described referring to the accompanying drawings.

Figure 1:
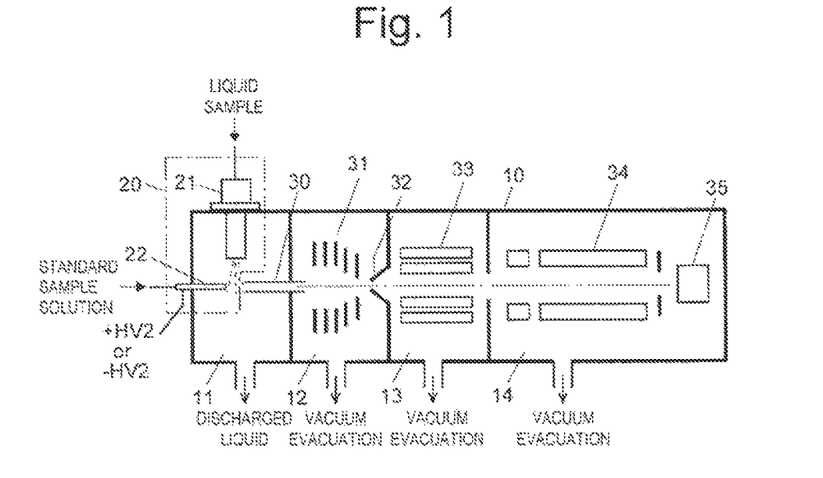
FIG. 1 is a drawing of principal elements in a mass spectrometer according to an embodiment of the present invention.
Figure 2:
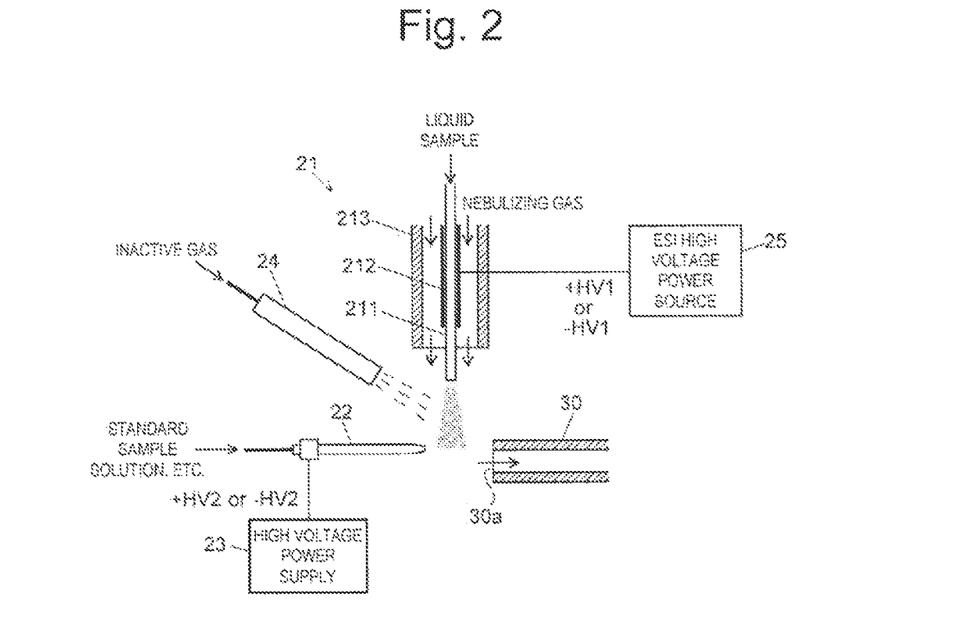
FIG. 2 is a schematic drawing of an ion source in the mass spectrometer according to the embodiment.

FIG. 1 is a drawing of principal elements in a mass spectrometer according to this embodiment. FIG. 2 is a schematic drawing of an ion source 20 in the mass spectrometer according to the embodiment.

As illustrated in FIG. 1, a chamber 10 in the mass spectrometer according to this embodiment includes an ionization chamber 11, an analysis chamber 14, and first and second intermediate vacuum chambers 12 and 13 in which the degree of vacuum is increased in phases. The ionization chamber 11 has atmosphere at substantially atmospheric pressure. The analysis chamber 14 is controlled by a high-performance vacuum pump, not illustrated in the drawing, to constantly have high vacuum atmosphere. The first and second intermediate vacuum chambers 12 and 13 are interposed between the ionization chamber 11 and the analysis chamber 14. Thus, the mass spectrometer according to this embodiment is configured as a multi-stage differential pumping system. The ion source 20 having distinctive features described later is disposed in the ionization chamber 11. The ionization chamber 11 and the first intermediate vacuum chamber 12 communicate with each other through a thin ion introducing pipe 30.

Ion guides 31 and 33 are respectively disposed in the first intermediate vacuum chamber 12 and the second intermediate vacuum chamber 13 to allow ions to be converged and guided to rear stages of the ionizer. The first and second intermediate vacuum chambers 12 and 13 are separated with a skimmer 32 with micropores formed at its top. In the analysis chamber 14, a quadrupole mass filter 34 and an ion detector 35 are disposed. The quadrupole mass filter 34 separates ions based on their mass-to-charge ratios m/z. The ion detector 35 detects ions passing through the quadrupole mass filter 34. The structural elements may include but are not necessarily limited to the devices described thus far. For example, the quadrupole mass filter 34 may be replaced with an orthogonal acceleration time-of-flight mass spectrometer.

In the ion source 20, an ionization probe 21 attached to the wall surface of the chamber 10 includes, as illustrated in FIG. 2, a capillary 211 through which a liquid sample is provided from the outside, a metallic slender tube 212 into which the capillary 211 is inserted, and a nebulizing gas pipe 213. The capillary 211 is made of, for example, glass. The nebulizing gas pipe 213 is a tubular pipe substantially coaxial with the capillary 211 and the metallic slender tube 212. One end of the capillary 211 (lower end in FIG. 2) protrudes by a predetermined length from the tail end of the nebulizing gas pipe 213. A predetermined high voltage (+HV1 or −HV1) from an ESI high voltage power supply 25 is applied to the metallic slender tube 212.

An electroconductive capillary 22 made of, for example, a metal is disposed at a position forward in a flow direction of a nebulized flow (downward in FIG. 2) from the ionization probe 21. A predetermined voltage (+HV2 or −HV2) from a high voltage power supply 23 is applied to the electroconductive capillary 22. An ion introducing opening 30a, which is an inlet of the ion introducing pipe 30 at one end, is also disposed at a position forward in the flow direction of the nebulized flow from the ionization probe 21. A heating gas port 24 is further provided to eject a dry inert gas toward the nebulized flow from the ionization probe 21. In the electroconductive capillary 22 described herein, its one end (right end in FIG. 2) has a tapered shape with a sharp tip.

Next, an operation of mass spectrometry typically performed by the mass spectrometer according to this embodiment is hereinafter described. An eluate flowing out from the column of a liquid chromatograph (LC), not illustrated in the drawings, is introduced into the ion source 20 of the mass spectrometer according to this embodiment. This eluate contains various components separated timewise in the column of the LC. These components are targets to be analyzed in the mass spectrometer according to this embodiment.

When, in the ion source 20, the components in the eluate are ionized and then subjected to mass spectrometry, the electroconductive capillary 22, through which no material is provided, only functions as a needle electrode. After the elute is provided through the capillary 211 of the ionization probe 21, the eluate in the capillary 211 is acted upon by a biased electric field formed by a high voltage applied from the ESI high voltage power supply 25 to the metallic slender tube 212. This electric field imparts positive or negative electric charges to the eluate. The eluate that arrived at the end of the capillary 211 is nebulized and ejected in the form of electrically charged droplets, being assisted by a nebulizing gas blow from a flow path between the nebulizing gas pipe 213 and the capillary 211, into the ionization chamber 11 having atmosphere at substantially atmospheric pressure.

The electrically charged droplets ejected from the ionization probe 21 come into contact with ambient gas and thus break down into minute droplets. Further, the electrically charged droplets are exposed to a heated dry gas blow from a heating gas port 24, which accelerates vaporization of a solvent from the electrically charged droplets. As the electrically charged droplets are further fining down and desolvating, sample components included in the electrically charged droplets are ionized. This is ionization by the ESI.

A high voltage applied from the high voltage power supply 23 to the electroconductive capillary 22 generates corona discharge around the tip of the electroconductive capillary 22. The electroconductive capillary 22 has the sharp tip as described earlier. Such a sharp tip may facilitate generation of corona discharge at the tip of the electroconductive capillary 22 or may avoid undesired generation of corona discharge in any other part of the electroconductive capillary 22. Molecules of the solvent vaporized from the nebulized and electrically charged droplets ejected from the ionization probe 21 are ionized by the corona discharge. Then, resulting solvent molecular ions react with molecules of the sample components not ionized yet, and the molecules of the sample components are accordingly ionized. This is ionization by the APCI. Thus, two ionizing means; ESI-based ionization and APCI-based ionization, can be used to ionize the molecules of components in the liquid sample.

The sample component-derived ions thus produced are mostly guided by an air flow generated by a pressure difference between the ionization chamber 11 and the first intermediate vacuum chamber 12 and sucked into the ion introducing pipe 30 through the ion introducing opening 30a, and then enters the first intermediate vacuum chamber 12. The ions are converged in the ion guide 31 and guided into the second intermediate vacuum chamber 13 through the micropores formed at the top of the skimmer 32. The ions are then converged in the ion guide 33 and guided into the analysis chamber 14. Predetermined voltages from a power supply, not illustrated in the drawings, are applied to four rod electrodes constituting the quadrupole mass filter 34, and ions having mass-to-charge ratios that correspond to the applied voltages alone are allowed to pass through the quadrupole mass filter 34 and are incident into the ion detector 35. The ion detector 35 outputs a detection signal in response to the amount of incident ions. Therefore, when, for example, the voltages applied to the rod electrodes constituting the quadrupole mass filter 34 are scanned within a predetermined range of voltages, the mass-to-charge ratios of ions allowed to pass through the quadrupole mass filter 34 may be scanned within a predetermined range of mass-to-charge ratios. A data processor, not illustrated in the drawings, serially receives the detection signals and provide, based on the received signals, a mass spectrum indicating signal strengths of ions within a predetermined range of mass-to-charge ratios.

The mass spectrometer according to this embodiment may be subjected to tuning before the analysis starts so as to optimize voltages to be applied to the respective structural elements, for example, the ion guides 31 and 33. The tuning is performed with a standard sample containing known components. Such a standard sample is also used to calibrate the values of mass-to-charge ratios.

Figure 3:
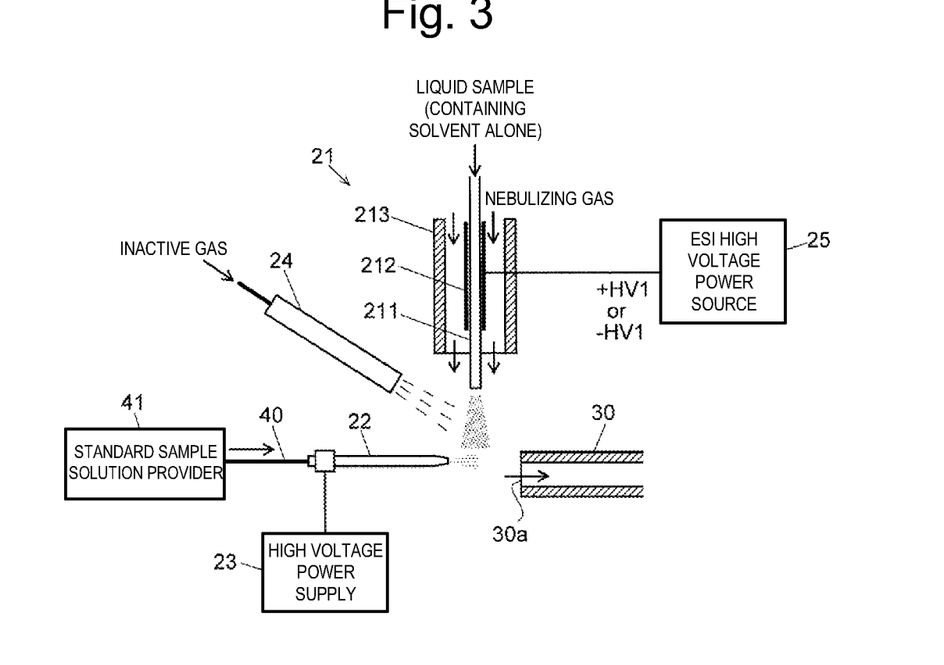
FIG. 3 is a drawing of an exemplified use of the ion source in the mass spectrometer according to the embodiment.

Next, an operation to carry out mass spectrometry of a standard sample is hereinafter described referring to FIG. 3. As illustrated in FIG. 3, a standard sample solution provider (liquid supply) 41 is connected to a pipe 40 leading to the electroconductive capillary 22. Then, a liquid sample not containing any substantive sample components but a solvent alone, for example, mobile phase used in the liquid chromatograph alone is provided through the ionization probe 21. While no voltage from the high voltage power supply 23 is applied to the electroconductive capillary 22, a predetermined high voltage from the ESI high voltage power supply 25 is applied to the metallic slender tube 212. Further, a dry gas blow from the heating gas port 24, though not necessary, may preferably be used then.

The liquid sample containing a solvent alone is provided through the capillary 211 of the ionization probe 21, and a high voltage is applied to the metallic slender tube 212. As a result, a large amount of solvent molecular ions are produced from the electrically charged droplets ejected from the ionization probe 21. Meanwhile, the standard sample solution provided through the electroconductive capillary 22 via the pipe 40 is ejected in the form of droplets from the tip of the electroconductive capillary 22. These droplets are exposed to a dry gas blow from the heating gas port 24. The solvent in the droplets is accordingly rapidly vaporized, and molecules of components in the standard sample solution pop out of the droplets. The molecules come in contact with the solvent molecular ions and are ionized due to an ion molecular reaction. The standard sample-derived ions thus produced are mostly guided by an air flow generated by a pressure difference between the ionization chamber 11 and the first intermediate vacuum chamber 12 and sucked into the ion introducing pipe 30 through the ion introducing opening 30*a*. The ions are further guided to the rear-stage devices and subjected to mass spectrometry.

Thus, the mass spectrometer according to this embodiment is allowed to ionize components in the standard sample introduced into the ionization chamber 11 through the electroconductive capillary 22 and subject them to mass spectrometry, without any change to the pipe usually connected to the column outlet of the liquid chromatograph (by using the same pipe connection as in regular analysis). To allow a more smooth flow of the nebulized standard sample from the tip of the electroconductive capillary 22, a nebulizing gas blow may be ejected, in the same direction as the flow direction of the standard sample, from a nebulizing gas flow path coaxial with the electroconductive capillary 22. In the embodiment described above, the dry gas blow is ejected from the heating gas port 24 provided apart from the ionization probe 21. Instead, a heating gas pipe coaxial with the capillary 211, metallic slender tube 212, and nebulizing gas pipe 213 may be laid on the outer-peripheral side of the nebulizing gas pipe 213, for example. These features may be applicable to other embodiments hereinafter described.

While, in the embodiment described above, no voltage is applied to the electroconductive capillary 22 through which the standard sample solution flows, a high voltage of approximately several kV from the high voltage power supply 23 may be applied to the electroconductive capillary 22. A high voltage applied to the electroconductive capillary 22 causes a biased electric field to act upon the standard sample solution flowing through the electroconductive capillary 22. As a result, the solution is ejected in the form of electrically charged droplets. Thus, components in the standard sample solution are ionized by the ESI. The molecules of the components that have not been ionized are ionized due to an ion molecular reaction with the solvent molecular ions. In this manner, the standard sample-derived ions can be produced with higher efficiency.

Figure 4:
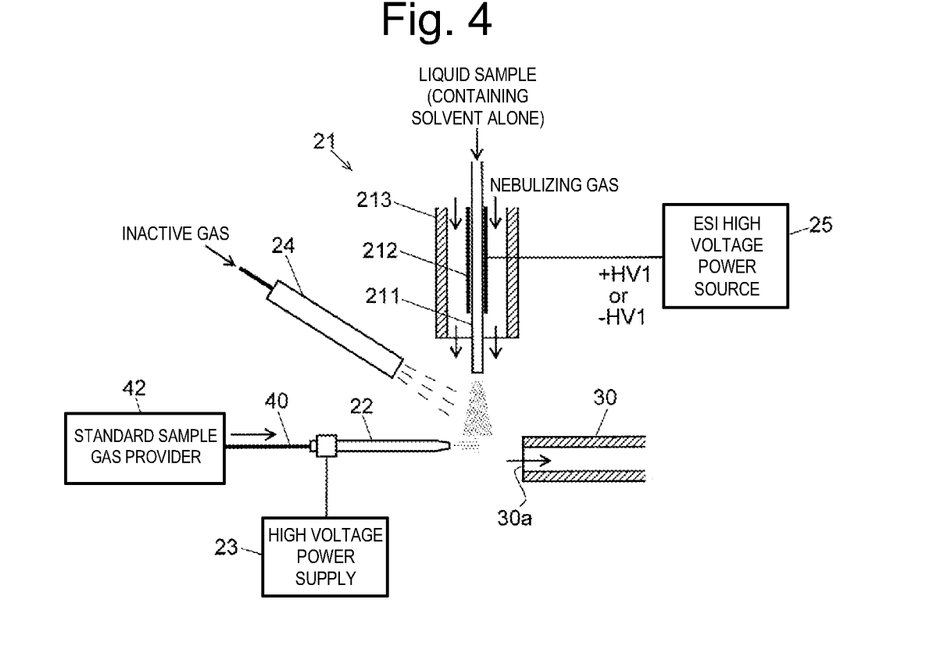
FIG. 4 is a drawing of another exemplified use of the ion source in the mass spectrometer according to the embodiment.

Other exemplified uses of the ion source 20 in the mass spectrometer according to this embodiment are hereinafter described referring to FIGS. 4 to 6.

While the standard sample in the example of FIG. 3 is a liquid sample, the standard sample may be a gas sample. In this instance, a standard sample gas provider 42 is connected to the pipe 40 leading to the electroconductive capillary 22, as illustrated in FIG. 4. The standard sample gas provider 42 includes a standard sample gas reservoir and a flow rate adjuster that adjusts a gas flow rate. The standard sample gas provides 42 provides through the pipe 40 a standard sample gas whose flow rate (or linear velocity) is adjusted by the flow rate adjuster. The standard sample may be a liquid or solid sample, and a gas evaporated from the liquid or solid sample and adjusted in flow rate may be flown into the pipe 40.

A liquid sample not containing any substantive components but a solvent alone is provided through the ionization probe 21. While no voltage from the high voltage power supply 23 is applied to the electroconductive capillary 22, a predetermined high voltage from the ESI high voltage power supply 25 is applied to the metallic slender tube 212. Further, a dry gas blow from the heating gas port 24, though not necessary, may preferably be used then.

The liquid sample containing a solvent alone is provided through the capillary 211 of the ionization probe 21, and a high voltage is applied to the metallic slender tube 212. As a result, a large amount of solvent molecular ions are produced from the electrically charged droplets ejected from the ionization probe 21. Meanwhile, the standard sample gas provided through the electroconductive capillary 22 via the pipe 40 blows out from the tip of the electroconductive capillary 22. The molecules of sample components in the gas come in contact with the solvent molecular ions and are ionized due to an ion molecular reaction. The standard sample-derived ions thus produced are mostly guided by an air flow generated by a pressure difference between the ionization chamber 11 and the first intermediate vacuum chamber 12 and sucked into the ion introducing pipe 30 through the ion introducing opening 30*a*. The ions are further guided to the rear-stage devices and subjected to mass spectrometry.

Figure 5:
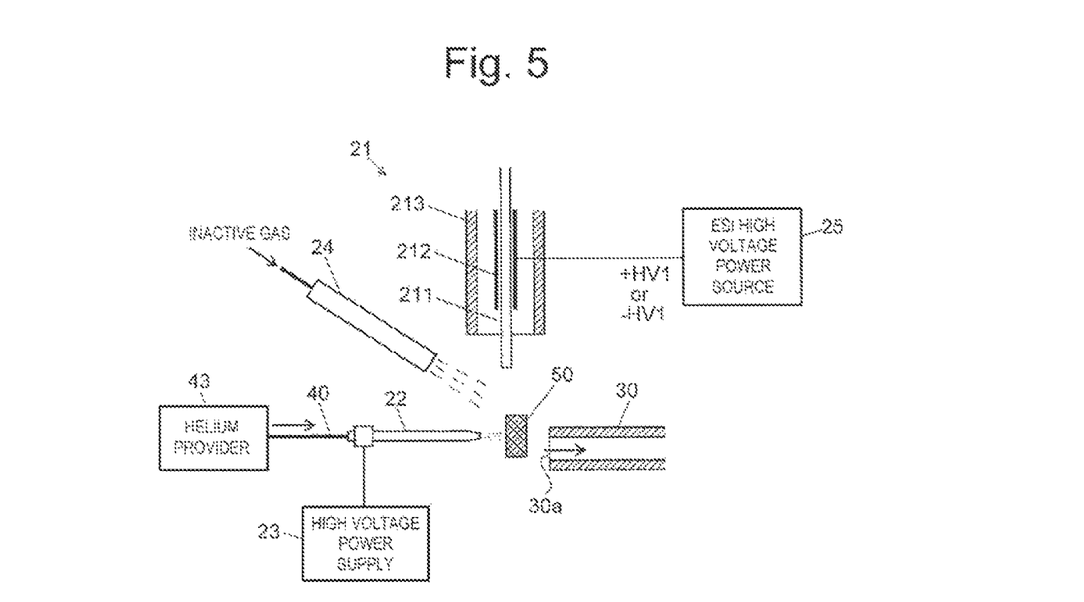
FIG. 5 is a drawing of still another exemplified use of the ion source in the mass spectrometer according to the embodiment.

FIG. 5 is a drawing of an exemplified use of the ion source 20 for ionization of sample components in a totally different mechanism.

As illustrated in FIG. 5, a helium provider 43 is connected to the pipe 40 leading to the electroconductive capillary 22, and a sample 50 in solid or liquid form to be analyzed is disposed at a position ahead of the tip of the electroconductive capillary 22. There is no supply of the liquid sample to the ionization probe 21, and the nebulizing gas blow is stopped. While no voltage from the high voltage power supply 23 is applied to the electroconductive capillary 22, a predetermined high voltage from the ESI high voltage power supply 25 is applied to the metallic slender tube 212. The dry gas blow is ejected from the heating gas port 24.

Helium provided by the helium provider 43 through the electroconductive capillary 22 via the pipe 40 blows out from the tip of the electroconductive capillary 22. As a result of a high voltage being applied to the metallic slender tube 212, with no flow of the solution to the capillary 211 of the ionization probe 21, electric discharge is generated in the vicinity of the tip of the ionization probe 21. The helium released into the ionization chamber 11 changes, due to this electric discharge, into a mixture of helium ions, electrons, and excited triplet molecular helium. The gas containing the excited triplet molecular helium is heated to a high temperature by the dry gas blow ejected from the heating gas port 24. When the high-temperature excited triplet molecular helium come in contact with water molecules in atmosphere, the water molecules are ionized by Penning ionization. The water molecular ions thus produced are in an excited state. Further, molecules of the components in the sample 50 are vaporized when the high-temperature gas containing the excited triplet molecular helium is blown against the sample 50. When the water molecular ions in the excited state act upon the component molecules thus vaporized, a reaction accordingly generated causes the component molecules to be ionized. The sample 50—derived ions thus produced are guided to the rear-stage devices through the ion introducing pipe 30 and then subjected to mass spectrometry.

The mechanism of ionizing the sample 50—derived components is basically similar to that of the DART ionization. The value of a voltage to be applied to the metallic slender tube 212 and/or the temperature of the dried gas blow ejected from the heating gas port 24 may be suitably adjusted in accordance with the type of the analysis target sample 50 and sample components desirably observed. In this manner, ions that are derived from any sample components desirably observed can be produced with higher efficiency. Instead of applying a high voltage to the metallic slender tube 212 to induce electric discharge in the vicinity of the edge of the ionization probe 21, a high voltage may be applied to the electroconductive capillary 22 so as to induce electric discharge and generate excited triplet molecular helium from the helium due to the induced electric discharge.

Figure 6:
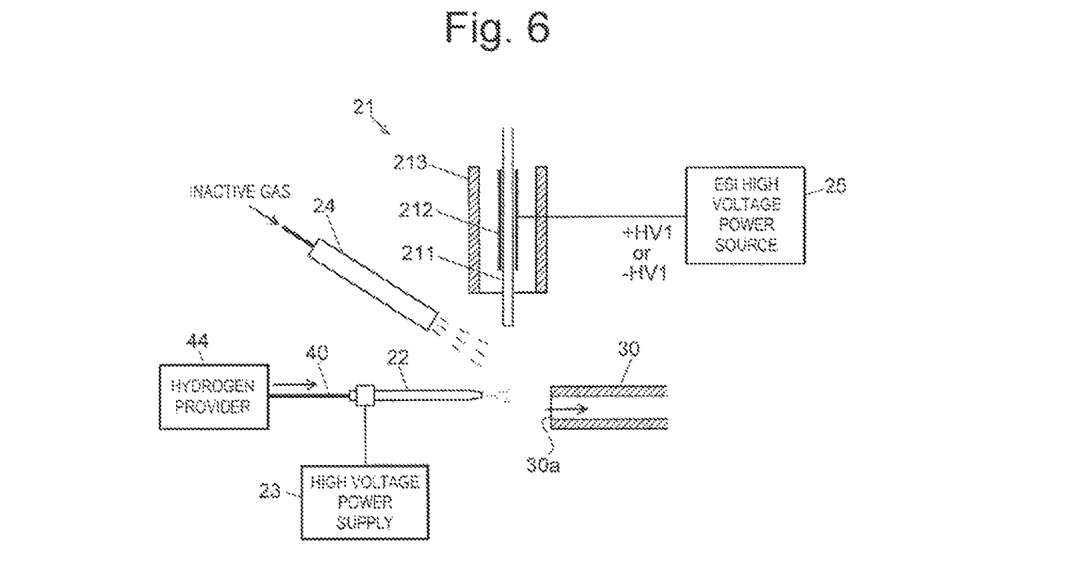
FIG. 6 is a drawing of yet another exemplified use of the ion source in the mass spectrometer according to the embodiment.

FIG. 6 is a drawing of an exemplified use of the ion source 20 for removal of contaminant from the ionization chamber 11 and the subsequent ion guide 31.

As illustrated in FIG. 6, a hydrogen provider 44 is connected to the pipe 40 leading to the electroconductive capillary 22. There is no supply of the liquid sample to the ionization probe 21, and the nebulizing gas blow is stopped. While no voltage from the high voltage power supply 23 is applied to the electroconductive capillary 22, a predetermined high voltage from the ESI high voltage power supply 25 is applied to the metallic slender tube 212. Whether to use the dry gas blow from the heating gas port 24 may be optionally decided.

A hydrogen gas provided by the hydrogen provider 44 through the electroconductive capillary 22 via the pipe 40 blows out from the tip of the electroconductive capillary 22. As a result of a high voltage being applied to the metallic slender tube 212, with no flow of the solution to the capillary 211 of the ionization probe 21, electric discharge is generated in the vicinity of the tip of the ionization probe 21. This electric discharge ionizes molecules of the hydrogen gas released into the ionization chamber 11. The hydrogen ions thus produced serve to remove contaminant adhered to, for example, the inner wall of the ionization chamber 11. Further, the hydrogen gas entering the first intermediate vacuum chamber 12 through the ion introducing pipe 30 serves to remove contaminant adhered to, for example, the ion guide 31.

Conventionally, the ionizer is disassembled to clean the inner wall of the ionization chamber 11. By leveraging hydrogen for removal of contaminant as described earlier, such disassembling work for cleaning purpose is not so frequently required as in the known art. This can reduce downtime of the ionizer.

Instead of applying a high voltage to the metallic slender tube 212 to induce electric discharge in the vicinity of the tip of the ionization probe 21, a high voltage may be applied to the electroconductive capillary 22 so as to induce electric discharge and ionize hydrogen due to the electric discharge.

Figure 7:
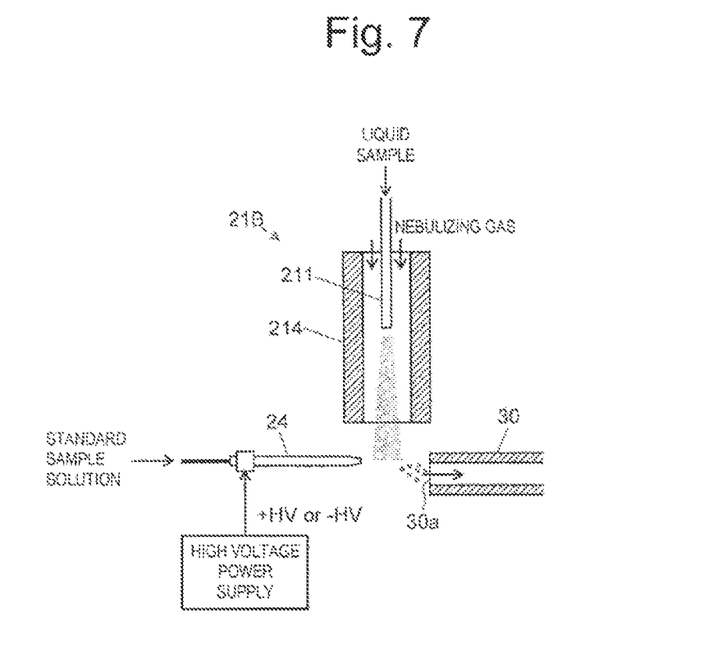
FIG. 7 is a schematic drawing of an ion source in a mass spectrometer according to another embodiment of the present invention.

The following description concerns an ion source in a mass spectrometer according to another embodiment of the present invention. FIG. 7 is a schematic drawing of the ion source. In this drawing, structural elements identical to those of FIGS. 1 to 6 are illustrated with the same reference signs.

The ionization probe 21 described in the earlier embodiment is adapted to ionize components in a liquid sample according to the ESI and APCI both. On the other hand, an ionization probe 21B of this embodiment is configured to ionize components in a liquid sample according to the APCI alone. A space ahead of a tip of the capillary 211 is surrounded by a heater 214 having a tubular shape, and the electroconductive capillary 22 and the ion introducing opening 30a of the ion introducing pipe 30 are disposed at positions ahead of the space.

At the time of ionizing components in a liquid sample supplied to the ionization probe 21B, the electroconductive capillary 22 receives no material, but merely functions as a needle electrode. For example, when an eluate from the column of the LC is provided through the capillary 211 of the ionization probe 21B, the eluate arrived at one end of the capillary 211 is nebulized and ejected, with the aid of a nebulizing gas blow from a flow path between the heater 214 and the capillary 211. A solvent in droplets of the nebulized flow passing through the space heated by the heater 214 is rapidly vaporized. A high voltage applied from the high voltage power supply 23 to the electroconductive capillary 22 generates corona discharge around the tip of the electroconductive capillary 22. Molecules of the solvent vaporized from the droplets ejected from the ionization probe 21B are ionized by the corona discharge. Then, resulting solvent molecular ions react with molecules of the sample components to ionize the molecules of the sample components. The liquid sample-derived ions thus produced are guided to the rear-stage devices through the ion introducing pipe 30 and then subjected to mass spectrometry.

At the time of ionizing components in a standard sample solution provided through the electroconductive capillary 22, a high voltage of approximately several kV from the high voltage power supply 23 is applied to the electroconductive capillary 22. A high voltage applied to the electroconductive capillary 22 causes a biased electric field to act upon the standard sample solution flowing through the electroconductive capillary 22. As a result, the solution is ejected in the form of electrically charged droplets. Thus, components in the standard sample solution are ionized by the ESI. The standard sample solution-derived ions thus produced are guided to the rear-stage devices through the ion introducing pipe 30 and then subjected to mass spectrometry.

In this embodiment, as well as the earlier embodiment, the standard sample-derived ions can be produced in the ionization chamber 11 and subjected to mass spectrometry without rearrangement of the pipe connected to the ionization probe 21B or without use of a flow-switching valve.

It should be understood that the embodiments described thus far only represent certain examples of the present invention. Any corrections, modifications, and/or additions may be made within the spirit and scope of the present invention, which should obviously be included in the scope of matters defined in the appended claims.

REFERENCE SIGNS LIST

10 . . . Chamber
11 . . . Ionization Chamber
12 . . . First Intermediate Vacuum Chamber
13 . . . Second Intermediate Vacuum Chamber
14 . . . Analysis Chamber
20 . . . Ion Source
21, 21B . . . Ionization Probe
211 . . . Capillary
212 . . . Metallic Slender Tube
213 . . . Nebulizing Gas Pipe
214 . . . Heater
22 . . . Electroconductive Capillary
23 . . . High Voltage Power Supply
24 . . . Heating Gas Port
25 . . . ESI High Voltage Power Supply
30 . . . Ion Introducing Pipe
30a . . . Ion Introducing Opening
31, 33 . . . Ion Guide
32 . . . Skimmer
34 . . . Quadrupole Mass Filter
35 . . . Ion Detector
40 . . . Pipe
41 . . . Standard Sample Solution Provider
42 . . . Standard Sample Gas Provider
43 . . . Helium Provider
44 . . . Hydrogen Provider
50 . . . Sample

The invention claimed is:

1. An ionizer, comprising:
a nebulizer configured to eject a liquid sample into atmosphere at atmospheric pressure to form a nebulized flow of the liquid sample;
an electroconductive capillary disposed at a position forward in a flow direction of the nebulized flow formed by the nebulizer;
a liquid supply configured to provide a liquid through the electroconductive capillary; and
a power supply configured to apply a voltage to the electroconductive capillary, wherein
the nebulizer includes:
a nozzle configured to eject the liquid sample; and
a heater configured to dry the liquid sample ejected through the nozzle, and
first components in the liquid sample are ionized by atmospheric pressure chemical ionization through corona discharge generated by the voltage applied to the electroconductive capillary by the power supply.

2. The ionizer according to claim 1, wherein
second components in the liquid are ionized by electrospray ionization by applying a predetermined voltage using the power supply to the electroconductive capillary through which the liquid is flown by the liquid supply, without ejecting the liquid sample from the nebulizer.

3. A mass spectrometer comprising, as an ion source, the ionizer according to claim 1.

4. An ionizer, comprising:

a nebulizer configured to eject a liquid sample into atmosphere at atmospheric pressure to form a nebulized flow of the liquid sample;

an electroconductive capillary disposed at a position forward in a flow direction of the nebulized flow formed by the nebulizer;

a liquid supply configured to provide a liquid through the electroconductive capillary; and a power supply configured to apply a voltage to the electroconductive capillary, wherein the nebulizer includes:

an electric field power supply configured to form a biased electric field that acts upon the liquid sample; and a nozzle configured to eject the nebulized flow of the liquid sample electrically charged by the electric field, and first components in the liquid sample are ionized by electrospray ionization and also ionized by atmospheric pressure chemical ionization through corona discharge generated by the voltage applied to the electroconductive capillary by the power supply.

5. The ionizer according to claim 4, wherein second components in the liquid are ionized by electrospray ionization by applying a predetermined voltage using the power supply to the electroconductive capillary through which the liquid is flown by the liquid supply, without ejecting the liquid sample from the nebulizer.

6. The ionizer according to claim 4, wherein the liquid sample includes a solvent; and the nebulizer is configured to eject the liquid sample electrically charged by the electric field through the nozzle so that molecules of the solvent are ionized by electrospray ionization to produce molecular ions that ionize second components in the liquid provided by the liquid supply through the electroconductive capillary due to an ion molecular reaction.

7. A mass spectrometer comprising, as an ion source, the ionizer according to claim 4.

8. An ionizer, comprising:

a nebulizer configured to eject a liquid sample into atmosphere at atmospheric pressure to form a nebulized flow of the liquid sample;

an electroconductive capillary disposed at a position forward in a flow direction of the nebulized flow formed by the nebulizer;

a gas supply configured to provide a gas through the electroconductive capillary; and a power supply configured to apply a voltage to the electroconductive capillary, wherein the nebulizer includes:

a nozzle configured to eject the liquid sample; and a heater configured to dry the liquid sample ejected through the nozzle, and first components in the liquid sample are ionized by atmospheric pressure chemical ionization through corona discharge generated by the voltage applied to the electroconductive capillary by the power supply.

9. A mass spectrometer comprising, as an ion source, the ionizer according to claim 8.

10. An ionizer, comprising:
a nebulizer configured to eject a liquid sample into atmosphere at atmospheric pressure to form a nebulized flow of the liquid sample;
an electroconductive capillary disposed at a position forward in a flow direction of the nebulized flow formed by the nebulizer;
a gas supply configured to provide a gas through the electroconductive capillary; and
a power supply configured to apply a voltage to the electroconductive capillary, wherein
the nebulizer includes:
an electric field power supply configured to form a biased electric field that acts upon the liquid sample; and
a nozzle configured to eject the nebulized flow of the liquid sample electrically charged by the electric field, and
first components in the liquid sample are ionized by electrospray ionization and also ionized by atmospheric pressure chemical ionization through corona discharge generated by the voltage applied by the power supply to the electroconductive capillary.

11. The ionizer according to claim 10, wherein
the liquid sample includes a solvent; and
the nebulizer is configured to eject the liquid sample electrically charged by the electric field through the nozzle so that molecules of the solvent are ionized by electrospray ionization to produce molecular ions that ionize second components in the gas provided by the gas supply through the electroconductive capillary due to an ion molecular reaction.

12. The ionizer according to claim 10, wherein
the gas supply is configured to provide helium through the electroconductive capillary,
the ionizer further includes a heater configured to heat a gas flow flowing out from the electroconductive capillary,
a sample in solid or liquid form is disposed at a position ahead of a tip of the electroconductive capillary,
electric discharge is generated by applying a voltage to the nozzle of the nebulizer using the electric field power supply without providing the liquid sample through the nozzle or by applying a voltage to the electroconductive capillary using the power supply,
the helium provided by the gas supply through the electroconductive capillary is excited due to an action of the electric discharge, and
third components in the sample in solid or liquid form are ionized by exposing the sample in solid or liquid form to the helium excited.

13. The ionizer according to claim 10, wherein
the gas supply is configured to provide hydrogen through the electroconductive capillary,
electric discharge is generated by applying a voltage to the nozzle of the nebulizer using the electric field power supply without providing the liquid sample through the nozzle or by applying a voltage to the electroconductive capillary using the power supply, and
the hydrogen provided by the gas supply through the electroconductive capillary is ionized due to an action of the electric discharge.

14. A mass spectrometer comprising, as an ion source, the ionizer according to claim 10.

\* \* \* \* \*